(12) United States Patent
Takahashi et al.

(10) Patent No.: US 10,855,154 B2
(45) Date of Patent: *Dec. 1, 2020

(54) ACTUATOR AND ELECTRIC BEAUTIFYING DEVICE

(71) Applicants: Yuki Takahashi, Tokyo (JP); Yasutaka Kitamura, Tokyo (JP); Masaharu Kagami, Tokyo (JP); Chikara Sekiguchi, Tokyo (JP); Kazutaka Sakaguchi, Tokyo (JP); Shigenori Inamoto, Tokyo (JP)

(72) Inventors: Yuki Takahashi, Tokyo (JP); Yasutaka Kitamura, Tokyo (JP); Masaharu Kagami, Tokyo (JP); Chikara Sekiguchi, Tokyo (JP); Kazutaka Sakaguchi, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 16/090,347

(22) PCT Filed: Mar. 24, 2017

(86) PCT No.: PCT/JP2017/011918
§ 371 (c)(1),
(2) Date: Oct. 1, 2018

(87) PCT Pub. No.: WO2017/170188
PCT Pub. Date: Oct. 5, 2017

(65) Prior Publication Data
US 2019/0115816 A1    Apr. 18, 2019

(30) Foreign Application Priority Data
Mar. 31, 2016    (JP) .................... 2016-073071

(51) Int. Cl.
*H02K 33/16*    (2006.01)
*A45D 29/14*    (2006.01)
(Continued)

(52) U.S. Cl.
CPC ............. *H02K 33/16* (2013.01); *A45D 29/14* (2013.01); *A61C 17/34* (2013.01); *B26B 19/282* (2013.01); *B26B 19/388* (2013.01)

(58) Field of Classification Search
CPC ......... H02K 33/00; H02K 33/02; H02K 33/16
See application file for complete search history.

(56) References Cited

U.S. PATENT DOCUMENTS 6,151,780 A    11/2000   Klein
9,755,491 B2 *  9/2017   Takahashi .............. H02K 33/16

FOREIGN PATENT DOCUMENTS

JP    2000-500370 A    1/2000
JP    3427468 B2       7/2003
(Continued)

OTHER PUBLICATIONS

International Search Report from International Application No. PCT/JP2017/011918 dated Jun. 6, 2017.

*Primary Examiner* — Forrest M Phillips
(74) *Attorney, Agent, or Firm* — Brundidge & Stanger, P.C.

(57) ABSTRACT

An actuator has: an affixed section having a coil; a first mobile section that is elastically held and disposed so as to allow movement in the axial direction inside one end of the coil, and has a first magnet magnetized in the axial direction of the coil and disposed on one end in the axial direction; and a second mobile section that is elastically held and disposed so as to allow movement in the axial direction inside another end of the coil, and has a second magnet magnetized in the axial direction and disposed on the other end in the axial (Continued)

direction. The first and second magnets are disposed such that identical magnetic poles are in the same direction in the axial direction, and the first and second mobile sections move in opposite directions along the same axis when a current is applied to the coil.

9 Claims, 12 Drawing Sheets

(51) Int. Cl.
    *A61C 17/34*         (2006.01)
    *B26B 19/28*         (2006.01)
    *B26B 19/38*         (2006.01)

(56) References Cited

FOREIGN PATENT DOCUMENTS

| | | | |
|---|---|---|---|
| JP | 3475949 | B2 | 12/2003 |
| JP | 4123232 | B2 | 7/2008 |

* cited by examiner

ACTUATOR AND ELECTRIC BEAUTIFYING DEVICE

TECHNICAL FIELD

The present invention relates to an actuator and an electric beauty device.

BACKGROUND ART

Conventionally, an electric beauty device such as an electric razor, an electric hair clipper or an electric toothbrush is known (e.g., Patent Literature 1). In the electric beauty device, a movable member (an inner blade or an outer blade in a case of the electric razor) is brought into a reciprocating motion to perform beautification treatment such as hair shaving and shaving. Generally, the electric beauty device is held by hand and used. However, if vibration or noise is great, a user feels discomfort, and user-friendliness is poor. Therefore, various techniques have been proposed as vibration countermeasures of electric beauty devices (e.g., Patent Literatures 2 to 4).

More specifically, Patent Literature 2 discloses a linear oscillator that connects an amplitude control weight to a movable section to bring into a reciprocating motion at a resonance frequency, i.e., that applies a dynamic vibration absorber.

Furthermore, Patent Literature 3 discloses a reciprocating electric razor that includes two movable sections (a center movable element and a side movable element) disposed in parallel, and drives the two movable sections such that motion directions are opposite. Furthermore, Patent Literature 4 discloses an electric razor apparatus that uses a power conversion mechanism to convert a motor drive force into a linear motion, and drives two inner blades in opposite directions on the identical axis (on a guide member).

CITATION LIST

Patent Literature

PTL 1
Japanese Patent No. 4123232
PTL 2
Japanese Patent No. 3475949
PTL 3
Japanese Patent No. 3427468
PTL 4
Japanese Unexamined Patent Application Publication (Translation of PCT Application) No. 2000-500370

SUMMARY OF INVENTION

Technical Problem

However, when the technique disclosed in Patent Literature 2 is applied, a space for disposing the dynamic vibration absorber is necessary. Therefore, it is difficult to miniaturize a product.

Furthermore, when the technique disclosed in Patent Literature 3 is applied, the motion directions of the two movable sections are not on the identical axis. Therefore, when a gravitational position is uneven, a vibration generation direction is shifted, and it is difficult to completely suppress vibration.

Furthermore, when the technique disclosed in Patent Literature 4 is applied, the space for disposing the power conversion mechanism is necessary. Therefore, it is difficult to miniaturize a product. Furthermore, a drive speed is limited for driving of a motor, and therefore there is also a task that high speed driving is difficult.

As described above, it is demanded to realize high speed driving of an actuator used for a product such as the electric beauty device while making it easy to miniaturize the product.

An object of the present invention is to provide an actuator and an electric beauty device that can prevent transmission of vibration to a user by reciprocating motions of movable sections and miniaturize a product.

Solution to Problem

An aspect of an actuator of the present invention includes:
a fixing section that includes a coil;
a first movable section that includes a first magnet that is magnetized in an axial direction of the coil and is disposed on a side of one end portion in an axial direction of the coil, the first movable section being disposed on an inner side of the one end portion of the coil movably in the axial direction of the coil in a state where the first movable section is elastically held; and
a second movable section that includes a second magnet that is magnetized in the axial direction of the coil and is disposed on a side of an other end portion in an axial direction of the coil, the second movable section being disposed on an inner side of the other end portion of the coil movably in the axial direction of the coil in a state where the second movable section is elastically held, wherein:
the first magnet and the second magnet are disposed such that same magnetic poles in the axial direction are in an identical direction; and
when a current flows to the coil, the first movable section and the second movable section move in opposite directions on a same axis An electric beauty device of the present invention includes the actuator described above.

Advantageous Effects of Invention

According to the present invention, a first movable section and a second movable section perform reciprocating motions in opposite directions to cancel vibration, so that it is possible to effectively prevent transmission of vibration to a user. Furthermore, it is not necessary to provide a dynamic vibration absorber and a power conversion mechanism, so that it is possible to achieve a saved space and miniaturization.

DESCRIPTION OF EMBODIMENTS

Embodiments of the present invention will be described in detail with reference to the accompanying drawings.

Embodiment 1

Figure 1:
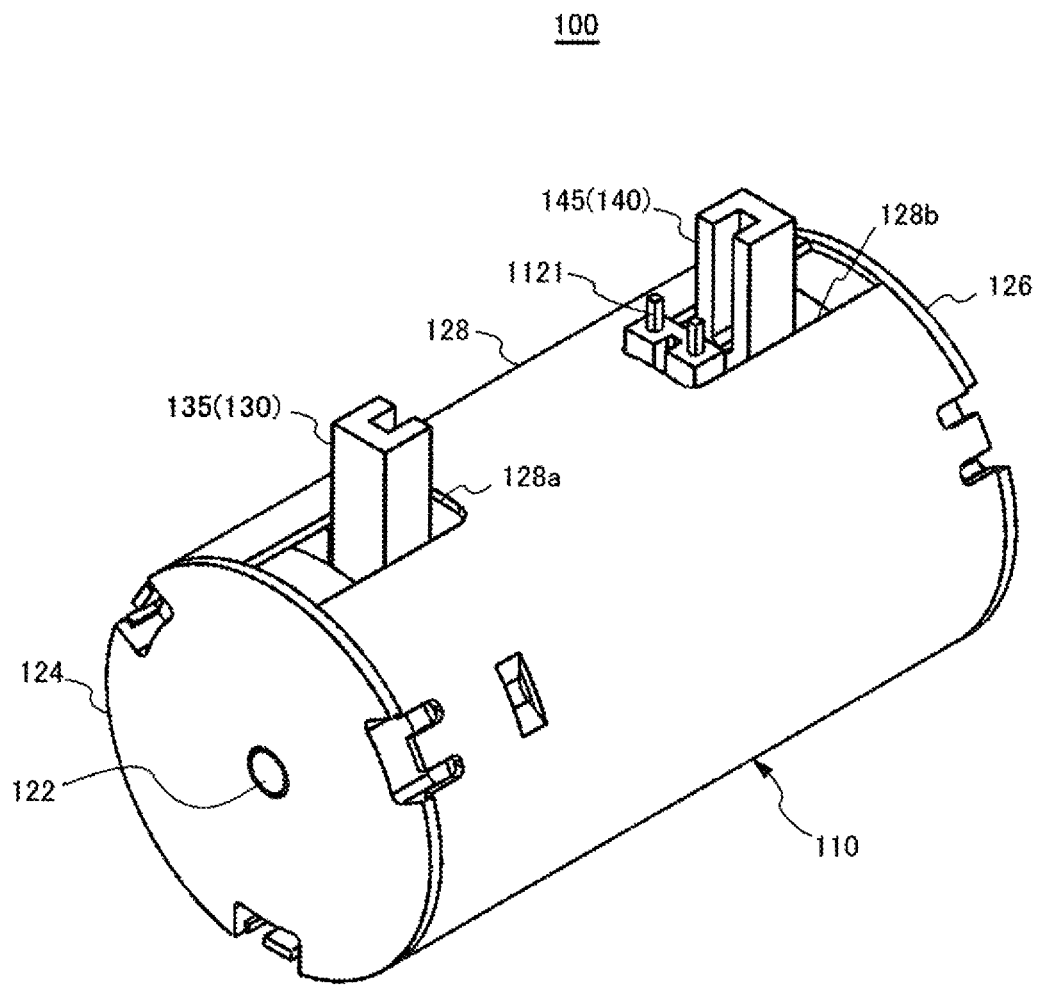
FIG. 1 is an outer appearance perspective view of an actuator according to Embodiment 1.
Figure 2:
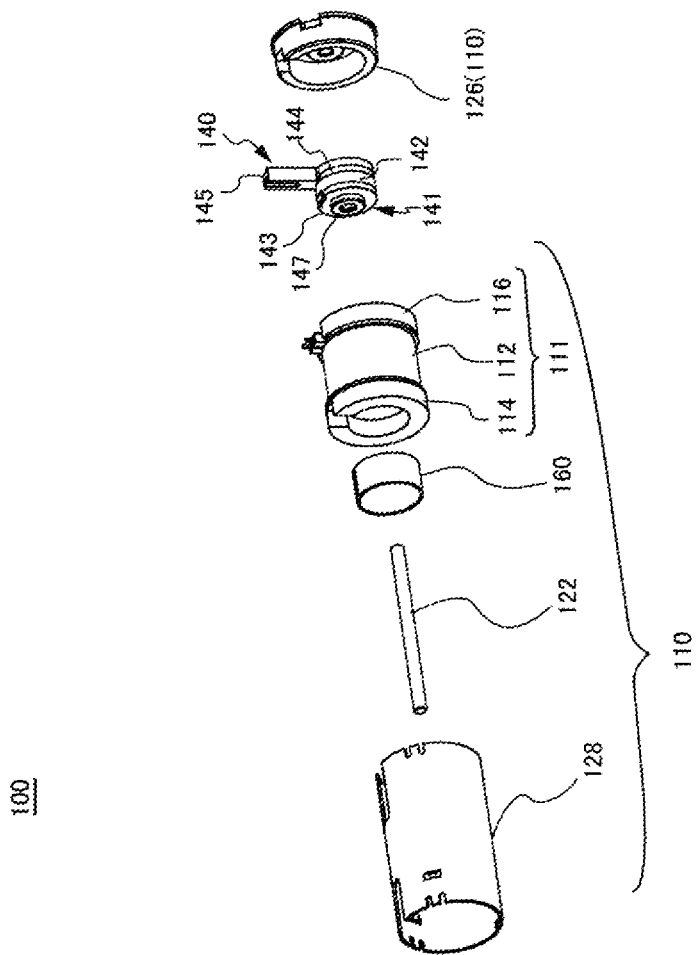
FIG. 2 is an exploded perspective view of the actuator according to Embodiment 1.
Figure 3:
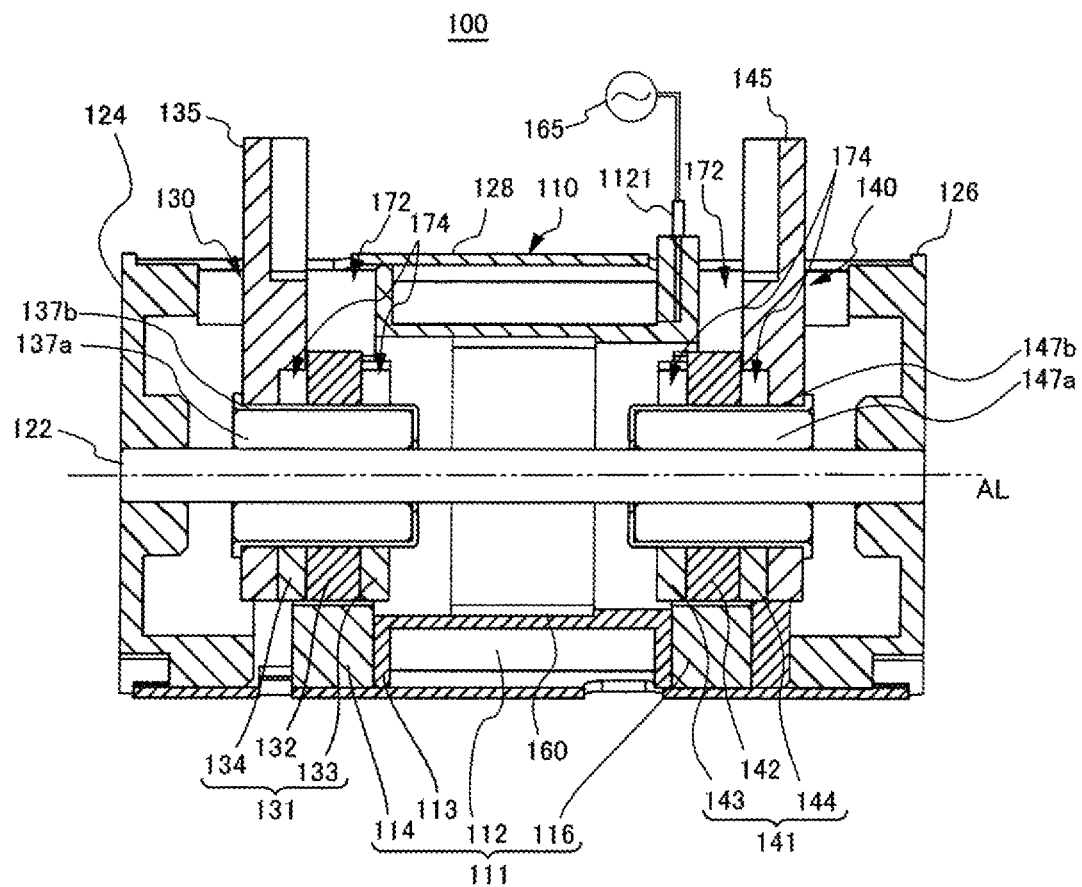
FIG. 3 is a vertical cross-sectional view along an axial direction of the actuator according to Embodiment 1.
Figure 4:
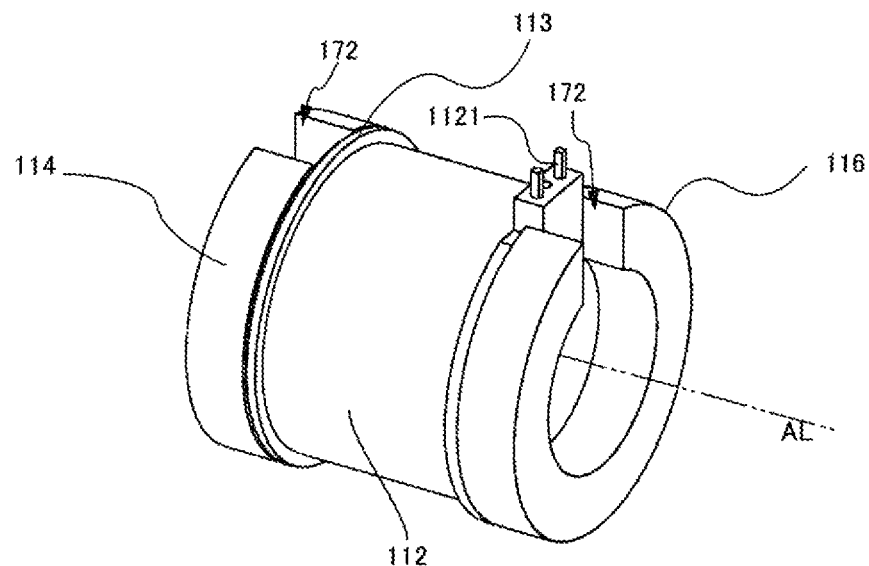
FIG. 4 is a perspective view of a coil section indicating a core of a fixing section.
Figure 5:
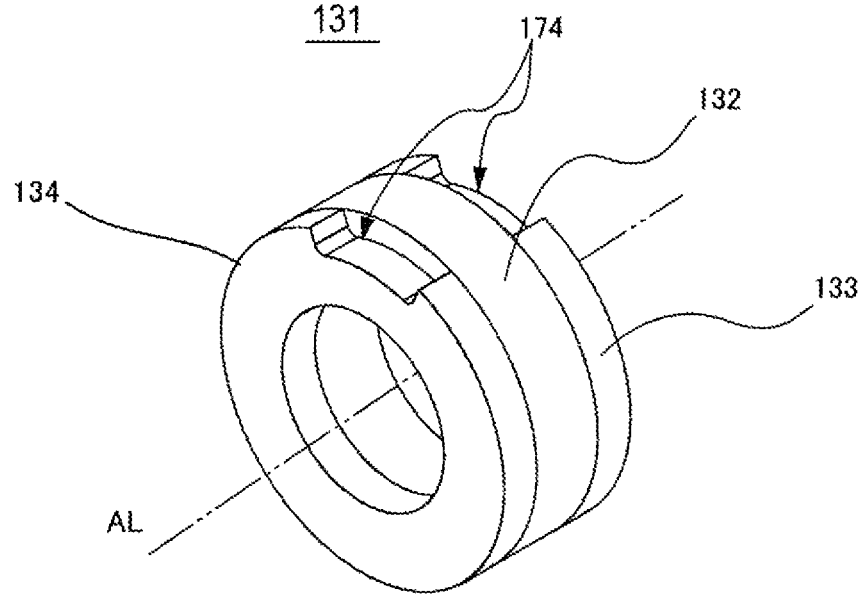
FIG. 5 is a perspective view of a magnet section of a movable section.

FIG. 1 is an outer appearance perspective view of actuator 100 according to Embodiment 1. FIG. 2 is an exploded perspective view of actuator 100. FIG. 3 is a vertical cross-sectional view in an axial direction of actuator 100. FIG. 4 is a perspective view of a coil section illustrating a core of a fixing section. FIG. 5 is a perspective view of a magnet section of a movable section.

This actuator 100 is an inner rotor actuator that is applied to an electric beauty device such as an electric razor.

As illustrated in FIGS. 1 to 3, actuator 100 includes fixing section 110, first movable section 130 and second movable section 140. First movable section 130 and second movable section 140 are symmetrically disposed about fixing section 110 on the same axis as (more specifically, on the identical axis to) coil section 111 of a tubular shape of fixing section 110, and perform reciprocating motions in the axial direction. In the present embodiment, first movable section 130 and second movable section 140 are moved in opposite directions in the axial direction by one coil 112 of coil section 111. That is, first movable section 130 and second movable section 140 move in directions close to each other or directions apart from each other in the axial direction.

Fixing section 110 includes coil section 111, brackets 124 and 126, case 128, spindle 122 and annular magnetic body 160.

Case 128 is a tubular (cylindrical in the drawings) body formed by a magnetic material. Coil section 111, first movable section 130 and second movable section 140 are housed in this housing. These coil section 111, first movable section 130 and second movable section 140 are disposed along the axial direction of case 128. In the present embodiment, case 128, coil section 111, first movable section 130 and second movable section 140 are disposed on same axis AL. Openings of both end portions of case 128 are closed by brackets 124 and 126, respectively, and case 128 and brackets 124 and 126 form a housing of a hollow columnar shape.

Coil section 111 functions as a stator, and both end portions are magnetized to have different polarities when electric power is distributed to coil 112.

Coil section 111 is disposed at a center portion in a longitudinal direction and along a circumferential direction of an inner circumferential surface of case 128. Coil section 111 is fixed to the inner circumferential surface of case 128 by adhesion, for example. Coil section 111 includes coil 112, bobbin 113 and cores 114 and 116.

Bobbin 113 is a member on which flanges are formed at both ends of a tubular (e.g., cylindrical shape) portion and that is made of an insulation material, and has the outer circumferential surface the entire length of which is wound by coil 112. Lead section 1121 led from coil 112 is provided to one flange of bobbin 113, and this lead section 1121 is connected with alternate-current electric power source 165.

The flanges at the both ends of bobbin 113 are respectively made of a magnetic material, and annular cores 114 and 116 that are magnetized when the current flows to coil 112 are disposed. Cores 114 and 116 and coil 112 form an electromagnet.

As illustrated in FIG. 4, cores 114 and 116 are formed in C-shaped cross sections including slits (cutout portions 172) at part of annular bodies. Slits (cutout portions) 172 having the same widths (the lengths in the circumferential direction) as recessed portions (cutout portions) 174 (see FIG. 5) of inner yokes 133 and 143 on a side of movable sections 130 and 140 are formed at overlapping positions in the circumferential direction. Thus, portions other than slits (cutout portions) 172 and portions other than recessed portions (cutout portions) 174 attract each other. Consequently, a position torque (detent torque) is produced in a rotation direction, and the position torque prevents relative rotation of cores 114 and 116 and inner yokes 133 and 143 in the circumferential direction.

Annular magnetic body 160 relaxes and reduces a magnetic resistance produced on the side of coil 112 in a magnetic circuit (described below) that drives first movable section 130 and second movable section 140 of actuator 100. Annular magnetic body 160 is an annular (tubular) magnetic material, and is disposed along the inner circumferential surface of coil section 111.

Spindle 122 movably supports first movable section 130 and second movable section 140. Spindle 122 is inserted and disposed in coil section 111 and annular magnetic body 160, and has both end portions fixed to and supported by brackets 124 and 126. An axis of spindle 122 is the same as axis AL of coil 112, cores 114 and 116 and case 128.

First movable section 130 includes first magnet 132, first inner yoke 133, first outer yoke 134, first output connection section 135 (also simply referred to as "output connection section 135" below) and first bearing section 137.

First magnet 132 is a permanent magnet of a tubular shape (a flat annular shape in the drawings), and is magnetized in the axial direction (that is the same as an axis AL direction) of first magnet 132. That is, a magnetization direction is a movement direction of first movable section 130.

In this regard, it is assumed that a surface of first magnet 132 on a side facing first inner yoke 133 is magnetized as an N-pole, and a surface on a side facing first outer yoke 134 is magnetized as an S-pole. Furthermore, first magnet 132 is desirably an anisotropic magnet that provides a strong magnetic force compared to an isotropic magnet.

First outer yoke 134 is a member of a tubular shape (a flat annular shape in the drawings) made of a magnetic material, and is connected to one end side of first magnet 132. First magnet 132 is fixed to first outer yoke 134 by adhesion, for example. Output connection section 135 that attaches a movable member (e.g., an inner blade of the electric razor) of the electric beauty device is attached to first outer yoke 134. In addition, output connection section 135 is formed by a resin, and is fixed to first outer yoke 134 by adhesion, for example. Output connection section 135 has an arm that protrudes from the inside of the housing to the outside of the housing via slit 128*a* (see FIG. 1) formed from one end side of case 128 along the axial direction.

First inner yoke 133 is a member of a tubular shape (a flat annular shape in the drawings) made of a magnetic material, and is fixed to the other end side of first magnet 132 by adhesion, for example Recessed portions (cutout portions) 174 are formed on first outer yoke 134 and first inner yoke 133 as described above. As illustrated in FIG. 5, recessed portions (cutout portions) 174 have shapes that are formed by cutting part of the outer circumferential surfaces to open in the axis AL direction, and have the same width as the widths (the lengths in the circumferential direction) of the cores 114 and 116 of coil section 111.

Recessed portions (cutout portions) 174 of first outer yoke 134 and first inner yoke 133 are respectively disposed to align in the axial direction. First inner yoke 133 is disposed at a position facing slit (cutout portion) 172 of core 114 in a radial direction.

These first magnet 132, first inner yoke 133 and first outer yoke 134 form first magnet section 131 whose both end portions in the axial direction are magnetized. First magnet section 131 is disposed with an air gap inside the one end side of coil section 111.

First magnet section 131 is positioned at a position facing the inner circumferential surface of core 114 by an attraction force between first magnet section 131 and core 114 that is made of a magnetic material that forms the one end portion of coil section 111. The center in the axial direction of first magnet 132 is located at a position overlapping the center in the axial direction of core 114.

First magnet 132, first inner yoke 133, first outer yoke 134 and first output connection section 135 are attached to spindle 122 with first bearing section 137 interposed therebetween movably in the axial direction on one end side of spindle 122. First bearing section 137 may be any type of a bearing such as a rolling bearing and a slide bearing as long as first bearing section 137 enables smooth movement of first movable section 130 on spindle 122 in the axial direction. Furthermore, as first bearing section 137, any bearing such as a sintered bearing or a resin or metal oilless bearing may be applied. In the present embodiment, first bearing section 137 is a slide bearing, and an oil-impregnated bearing formed by press-fitting bearing body 137*a* of a tubular shape made of a porous material in a bearing holder 137*b* of a tubular shape. In addition, a non-illustrated oil pocket is formed between bearing body 137*a* and bearing holder 137*b*.

First magnet 132, first inner yoke 133, first outer yoke 134 and first output connection section 135 are joined to the outer circumference of first bearing section 137, and are slidable along spindle 122. Spindle 122 restricts movement of first movable section 130 in the radial direction (a radiation direction from the axis) via first bearing section 137. Furthermore, first movable section 130 is elastically held movably in the axial direction by using the magnetic attraction force produced between the first magnet section and core 114 as a magnetic spring force.

Second movable section 140 is disposed symmetrically with first movable section 130. Second movable section 140 includes second magnet 142, second inner yoke 143, second outer yoke 144, second output connection section 145 (also simply referred to as "output connection section 145" below) and second bearing section 147.

Second magnet 142 is a permanent magnet of a tubular shape (a flat annular shape in the drawings), and is magnetized in the same direction as the magnetization direction of first magnet 132. In this regard, second magnet 142 is magnetized in the same direction as the magnetization direction of first magnet 132. Therefore, a surface of second magnet 142 on a side facing second inner yoke 143 is magnetized as the S-pole, and a surface facing second outer yoke 144 is magnetized as the N-pole.

Second outer yoke 144 is a member of a tubular shape (a flat annular shape in the drawings) made of a magnetic material, and is connected to other end side of second magnet 142. Second magnet 142 is fixed to second outer yoke 144 by adhesion, for example.

Furthermore, output connection section 145 that attaches the movable member (e.g., the inner blade of the electric razor) of the electric beauty device is attached to second outer yoke 144. In addition, output connection section 145 is formed by a resin, and is fixed to first outer yoke 134 by adhesion, for example. Output connection section 145 has an arm that protrudes from the inside of the housing to the outside of the housing via slit 128*b* (see FIG. 1) formed from the other end side of case 128 along the axial direction.

Second inner yoke 143 is a member of a tubular shape (a flat annular shape in the drawings) made of a magnetic material, and is fixed to the other end side of second magnet 142 by adhesion, for example These second magnet 142, second inner yoke 143 and second outer yoke 144 form second magnet section 141 whose both end portions in the axial direction are magnetized. Second magnet section 141 is disposed with an air gap inside the other end side of coil section 111.

Second magnet section 141 is positioned at a position facing the inner circumferential surface of core 116 by an attraction force between second magnet section 141 and core 116 that is made of a magnetic material that forms the other end portion of coil section 111. In this regard, the center in the axial direction of second magnet 142 is located at a position overlapping the center in the axial direction of core 116.

Second magnet 142, second inner yoke 143, second outer yoke 144 and second output connection section 145 are attached to spindle 122 with second bearing section 147 interposed therebetween movably in the axial direction on the other end side of spindle 122. Second bearing section 147 is the same slide bearing as first bearing section 137, and a sintered bearing or a resin or metal oilless bearing is applied. In the present embodiment, second bearing section 147 is an oil-impregnated bearing formed by press-fitting bearing body 147*a* of a tubular shape made of a porous material in a bearing holder 147*b* of a tubular shape. In addition, a non-illustrated oil pocket is formed between bearing body 147*a* and bearing holder 147*b*.

Second magnet 142, second inner yoke 143, second outer yoke 144 and second output connection section 145 are joined to the outer circumference of second bearing section 147, and are slidable along spindle 122.

Spindle 122 restricts movement of second movable section 140 in the radial direction (the radiation direction from the axis) via second bearing section 147. Furthermore, second movable section 140 is elastically held movably in the axial direction by using the magnetic attraction force produced between second magnet section 142 and core 116 as a magnetic spring force. In the present embodiment, second bearing section 147 is part of second movable section 140. However, second magnet section 142 may be provided on a side of spindle 122 as long as second magnet section 142 is movable with respect to spindle 122.

Figure 6:
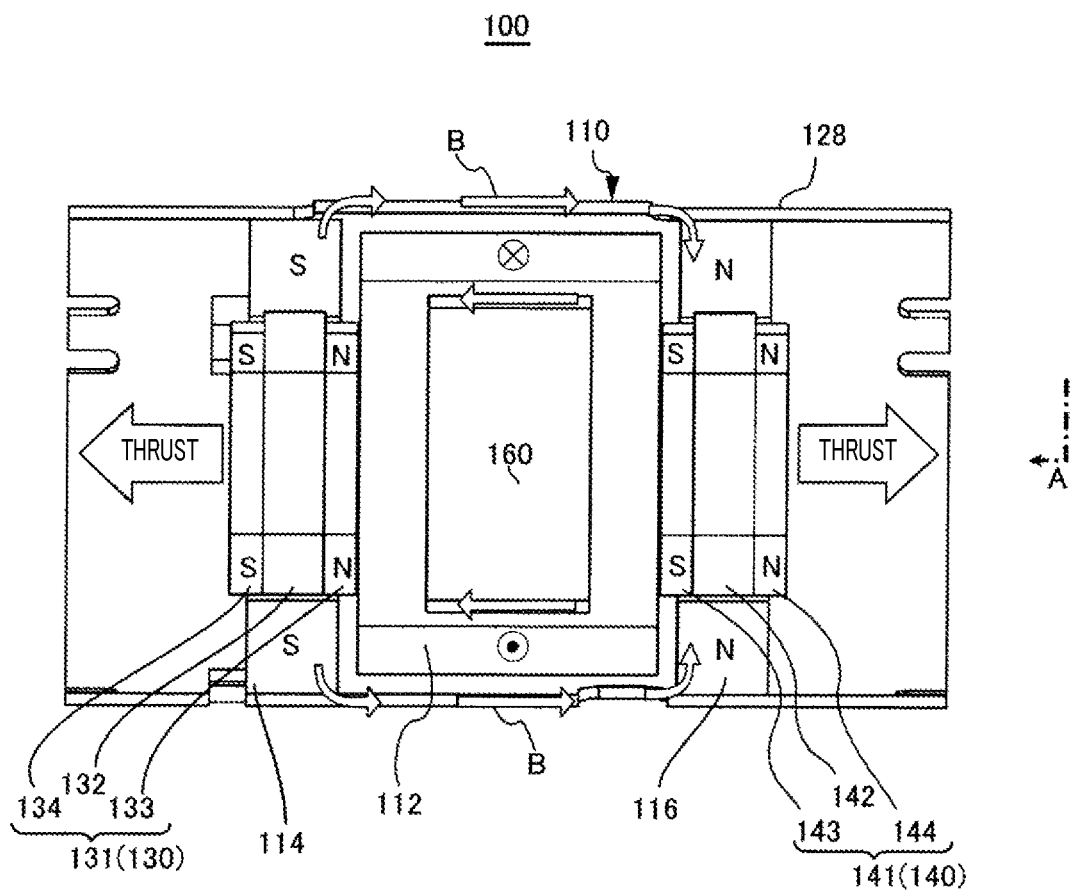
FIG. 6 is a view illustrating thrusts produced at a first movable section and a second movable section when a current flows to a coil.

FIG. 6 is a view illustrating thrusts produced by first movable section 130 and second movable section 140 when a current flows to coil 112. In addition, FIG. 6 schematically illustrates the vertical cross-sectional view of FIG. 3. Furthermore, the polarities of cores 114 and 116 illustrated in FIG. 6 are an example in a case where the clockwise current flows to coil 112 in an A arrow view of coil 112.

Figure 7A:
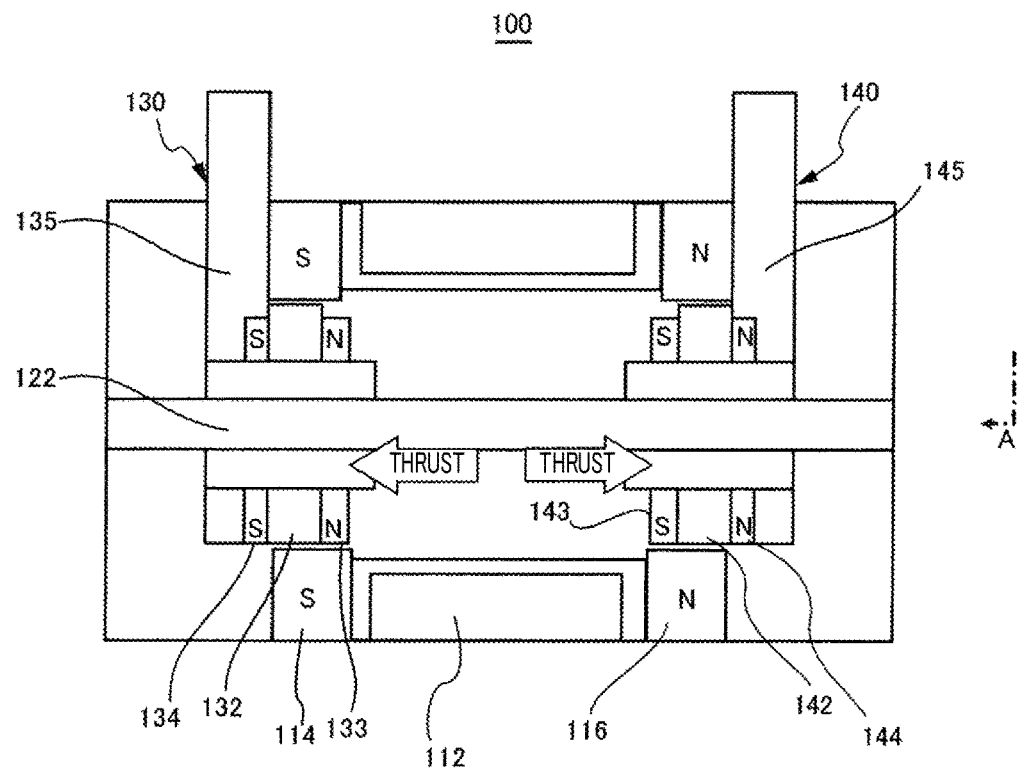
FIGS. 7A and 7B are views illustrating reciprocating motions of the movable sections of the actuator according to Embodiment 1.
Figure 7B:
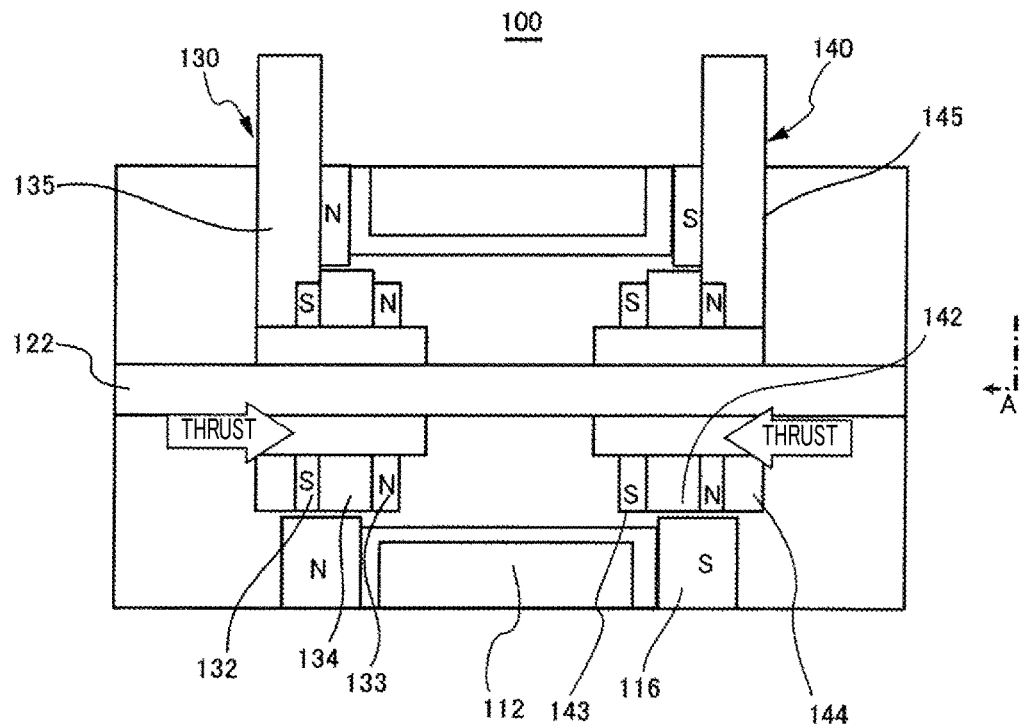

FIGS. 7A and 7B are views illustrating reciprocating motions of movable sections of actuator 100 according to Embodiment 1. FIG. 7A is a schematic view illustrating movement states of first movable section 130 and second movable section 140 when the clockwise current flows to coil 112 in the A arrow view. FIG. 7B is a schematic view illustrating movement states of first movable section 130 and second movable section 140 when the counterclockwise current flows to coil 112 in the A arrow view.

In actuator 100, above coil 112, cores 114 and 116, first magnet 132, first inner yoke 133, first outer yoke 134, second magnet 142, second inner yoke 143, second outer yoke 144 and annular magnetic body 160 form the magnetic circuit.

When the current flows to coil 112 wound along the inner circumference of case 128, a flow of a magnetic flux is produced in the axial direction of coil 112. The magnetic flux to be produced flows going out from one side in the axis AL direction of coil 112 to act on first magnet section 131 of first movable section 130 and act on core 114, case 128 of the tubular shape, core 116 and second magnet section 142 of second movable section 140, and passing coil 112.

Furthermore, when the current flows in the opposite direction to coil 112, the magnetic flux flows going out from the other side in the axis AL direction of coil 112 to act on second magnet section 142 of second movable section 140 and act on core 116, case 128, core 114 and first magnet section 131 of first movable section 130, and returning to the one end side of coil 112.

When a path between first movable section 130 and second movable section 140 in the magnetic circuit is formed only by cores 114 and 116, the magnetic resistance on a side of coil 112 in the magnetic circuit is determined by an air portion having low magnetic permeability on a circumference of the magnetic flux produced by coil 112, and increases in proportion to a distance of the air portion (the length of the air portion through which the magnetic flux passes). The distance on an inner circumferential side of coil 112 in the air portion is long compared to the air gap. Therefore, annular magnetic body 160 is provided to decrease the magnetic resistance. In addition, the thickness of annular magnetic body 160 is preferably the same as or equal to or more than the thickness of case 128 that sandwiches coil 112 between the inner and outer sides.

In the present embodiment, in actuator 100, first magnet 132 and second magnet 142 magnetize the side of first movable section 130 as the S-pole and the side of second movable section 140 as the N-pole, respectively. Therefore, as illustrated in FIG. 6, first magnet section 131 of first movable section 130 magnetizes first inner yoke 133 as the N-pole and first outer yoke 134 as the S-pole. Second magnet section 141 of second movable section 140 magnetizes second inner yoke 143 as the S-pole and second outer yoke 144 as the N-pole. In addition, annular magnetic body 160 is disposed inside coil 112 and along the circumferential direction on the inner circumferential surface of coil 112. Thus, the magnetic flux that travels from the side of second movable section 140 to the side of first movable section 130 passes annular magnetic body 160.

That is, when the clockwise current in the A arrow view flows to coil 112, the Ampère's right-hand screw rule produces in coil 112 the magnetic flux in such a direction that side of second movable section 140 is excited as the S-pole and the side of first movable section 130 is excited as the N-pole. Thus, the flow of the magnetic flux indicated by arrow B is produced, and the entire circumference of core 114 is excited as the S-pole and the entire circumference of core 116 is excited as the N-pole.

First inner yoke 133 of first movable section 130 is the N-pole. Therefore, the magnetic attraction force produces a thrust, and first movable section 130 moves apart from the N-pole produced on the side of first movable section 130 in coil 112 (see FIG. 7A).

Second inner yoke 143 of second movable section 140 is the S-pole. Therefore, the magnetic attraction force produces a thrust, and second movable section 140 moves apart from the S-pole produced on the side of second movable section 140 in coil 112 (see FIG. 7A).

Thus, when the current flows to coil 112, the two movable sections of first movable section 130 and second movable section 140 simultaneously move in the directions apart from each other on the identical axis.

Furthermore, when the counterclockwise current in the A arrow view in FIG. 6 flows to coil 112, the Ampère's right-hand screw rule produces in coil 112 the magnetic flux in the opposite direction to a direction in a case where the clockwise current that excites the side of first movable section 130 as the S-pole and the side of second movable section 140 as the N-pole flows.

Thus, the entire circumference of core 114 is excited as the N-pole, and the entire circumference of core 116 is excited as the S-pole, so that first movable section 130 and second movable section 140 move toward the inside of coil 112 in the axial direction.

First inner yoke 133 of first movable section 130 is the N-pole. Therefore, the magnetic attraction force produces a thrust that travels toward coil 112, and first movable section 130 moves toward the inside of coil 112 in the axial direction (see FIG. 7B).

Second inner yoke 143 of second movable section 140 is the S-pole. Therefore, the magnetic attraction force produces a thrust that travels toward coil 112, and second movable section 140 moves toward the inside of coil 112 in the axial direction (see FIG. 7B).

Thus, when the reverse current flows to coil 112, the two movable sections of first movable section 130 and second movable section 140 simultaneously move in the directions close to each other on the identical axis.

Hence, when the alternate-current flows to coil 112, first movable section 130 and second movable section 140 perform reciprocating motions in the opposite directions.

In addition, an equation of motion that indicates an operation principal of actuator 100 is expressed by following equation 1, and a circuit equation is expressed by following equation 2. That is, first movable section 130 and second movable section 140 perform the reciprocating motions based on equations 1 and 2, respectively.

(Equation 1)

$$m\frac{d^2 x(t)}{dt^2} = K_f i(t) - K_{sp} x(t) - D\frac{dx(t)}{dt} - F_{loss} \qquad [1]$$

m: mass [kg]

x(t): displacement [m]
K$_f$: thrust constant [N/A]
i(t): current [A]
K$_{sp}$: spring constant [N/m]
D: attenuation coefficient [N/(m/s)]
F$_{loss}$: load of friction component [N]

(Equation 2)

$$e(t) = Ri(t) + L\frac{di(t)}{dt} + K_e\frac{dx(t)}{dt} \quad [2]$$

e(t): voltage [V]
R: resistance [Ω]
L: inductance [H]
Ke: back EMF constant [V/(m/s)]

Furthermore, the resonance frequency of actuator 100 is determined based on masses and spring constants (that are spring constants of magnetic springs yet include spring constants of compression coil springs when there are the compression coil springs) of first movable section 130 and second movable section 140 as indicated by following equation 3. By driving actuator 100 by the alternate-current of the frequency that is substantially equal to the resonance frequency f$_r$, it is possible to efficiently obtain a high output. That is, it is possible to drive actuator 100 with low power consumption in a steady state, so that energy efficiency of actuator 100 improves.

(Equation 3)

$$f_r = \frac{1}{2\pi}\sqrt{\frac{K_{sp}}{m}} \quad [3]$$

f$_r$: resonance frequency [Hz]

Thus, actuator 100 according to Embodiment 1 includes fixing section 110 that includes coil 112, first movable section 130 that includes first magnet 132 that is magnetized in the axial direction (AL) of coil 112 and is disposed on the one end portion side in the axial direction of coil 112, and is disposed on the inner side of the one end portion of coil 112 movably in the axial direction of coil 112 in a state where first movable section 130 is elastically held, and second movable section 140 that includes second magnet 142 that is magnetized in the axial direction of coil 112 and is disposed on the other end portion side in the axial direction of coil 112, and is disposed on the inner side of coil 112 movably in the axial direction of coil 112 in a state wherein second movable section 140 is elastically held.

First magnet 132 and second magnet 142 are disposed such that the same magnetic pole is the same direction in the axial direction, and facing magnetic poles are different magnetic poles. Furthermore, when the current flows to coil 112, first magnet 132 of first movable section 130 and second magnet 142 of second movable section 140 obtain the thrusts in the opposite directions on the same axis and substantially simultaneously move in the opposite directions according to the direction of the magnetic flux produced by coil 112 according to the Ampère's right-hand screw rule. In this regard, first movable section 130 including first magnet 132, and second movable section 140 including second magnet 142 respectively move in the opposite directions substantially simultaneously on the identical axis.

First movable section 130 and second movable section 140 perform the reciprocating motions in the opposite directions on the same axis and thereby cancel vibration, so that actuator 100 can effectively prevent transmission of the vibration to a user. Furthermore, a spindle mechanism that supports first movable section 130 and second movable section 140 on the identical axis is used. Consequently, it is possible to easily design the gravitational centers of second movable section 140 and first movable section 130 on the identical axis, remove a shift in a vibration occurrence direction (the radiation direction from the axis in particular), and effectively prevent vibration compared to a structure that has a shift of the spindle that supports each movable section.

Furthermore, the magnetic attraction force produced by the first magnet section (first magnet 132 and first inner and outer yokes 133 and 134) and the second magnet section (first magnet 142 and first inner and outer yokes 143 and 144) whose movement in the radiation direction is restricted by spindle 122, and cores 114 and 116 restrict movement in the axial direction and positions the movement at a default position.

Consequently, when first movable section 130 and second movable section 140 are elastically held, first movable section 130 and second movable section 140 can be elastically held movably in the axial direction without using a mechanical spring such as a compression coil spring, and can be easily assembled.

Furthermore, cores 114 and 116 of fixing section 110 that face each other in the inner and outer circumferential directions (radial direction) and each of yokes 133 and 134, and 143 and 144 of first movable section 130 and second movable section 140 are provided with slits (cutout portions) 172 and recessed portions (cutout portions) 174. Consequently, a position torque is produced in the rotation direction (circumferential direction) between core 114, and first inner yoke 133 and first outer yoke 134, so that movement in the circumferential direction of first movable section 130 and second movable section 140 is restricted.

Consequently, the positions of first movable section 130 and second movable section 140 can be stabilized without setting rotation restriction toward the outside, and actuator 100 can be operated alone. Furthermore, it is possible to stabilize the position of each movable section during assembly, too, and improve assembly.

Furthermore, it is not necessary to provide a dynamic vibration absorber and a power conversion mechanism. Consequently, it is possible to achieve a saved space and miniaturization, and improve the degree of design freedom and design of a product to be mounted.

Consequently, by applying actuator 100, it is possible to realize the electric beauty device that has good design, causes little vibration and little noise and provides comfort for the user.

Furthermore, in actuator 100, coil 112 is wound in the same direction over the entire length of fixing section 110, and the magnetization direction of first magnet 132 is opposite to the magnetization direction of second magnet 142. Consequently, second movable section 140 and first movable section 130 can perform the reciprocating motions in the opposite directions with a simple configuration.

Furthermore, actuator 100 is an inner rotor type, and is not likely to contact the movable sections when being mounted. Consequently, unlike an outer rotor type adopting a structure that includes the movable sections that move outside the fixing section, it is not necessary to secure a space that becomes movable regions of the movable sections.

According to actuator 100 of the inner rotor type, the outermost surface of the housing is fixing section 110. Consequently, a portion of a fixing target to which actuator 100 can be fixed can be secured widely, and actuator 100 can be easily mounted. Furthermore, when actuator 100 is mounted, actuator 100 is the inner rotor type. Compared to the outer rotor type, a foreign material is hardly mixed in a gap (air gap) between each of first movable section 130 and second movable section 140 and fixing section 110, and an operation failure and damages hardly occur.

Furthermore, when miniaturization is achieved by the actuator structure that causes the movable sections to perform the reciprocating motions with respect to the fixing section inside the hollow housing, the magnetic flux readily gathers at the center portion and saturates in this structure. By contrast with this, actuator 100 is the inner rotor type in which a magnet can be disposed at the center portion. Consequently, it is possible to relax the magnetic flux by the magnets and achieve miniaturization without decreasing the characteristics.

Furthermore, annular magnetic body 160 is located inside coil 112, i.e., at the center portion of a hollow housing. Consequently, it is possible to relax the magnetic flux at the center portion, and improve magnetic circuit efficiency of actuator 100.

Furthermore, the electromagnetic conversion efficiency increases, and the thrusts of first movable section 130 and second movable section 140 increase. The magnetic resistance on the side of coil 112 is determined by the air portion having magnetic permeability on the circumference of the magnetic flux produced by coil 112, and increases in proportion to the distance of the air portion.

Furthermore, annular magnetic body 160 is disposed inside coil 112. Even when the width of coil 112 is increased, it is possible to realize an efficient magnetic path that does not cause a great magnetic resistance on the magnetic path and hardly causes magnetic saturation. Consequently, it is possible to improve output characteristics (a thrust constant that is electromagnetic conversion efficiency is 1.4 times compared to a configuration without annular magnetic body 160).

Furthermore, first movable section 130 and second movable section 140 on spindle 122 are elastically held by the magnetic spring mechanism so as to be able to perform reciprocating motions in the axial direction, and are driven by resonant driving. Consequently, first movable section 130 and second movable section 140 have the maximum amplitudes, and are efficiently driven.

Furthermore, first movable section 130 and second movable section 140 are elastically held only by the magnetic spring, so that actuator 100 is a reliable actuator without a metal fatigue unlike a case where the mechanical springs are used. In addition, the mechanical springs and parts (a spring holder and a movable section spring section) that accompany the spring bearing are unnecessary. Consequently, it is also possible to achieve low cost by reducing parts and reduce the man hours of assembly.

Embodiment 2

Figure 8:
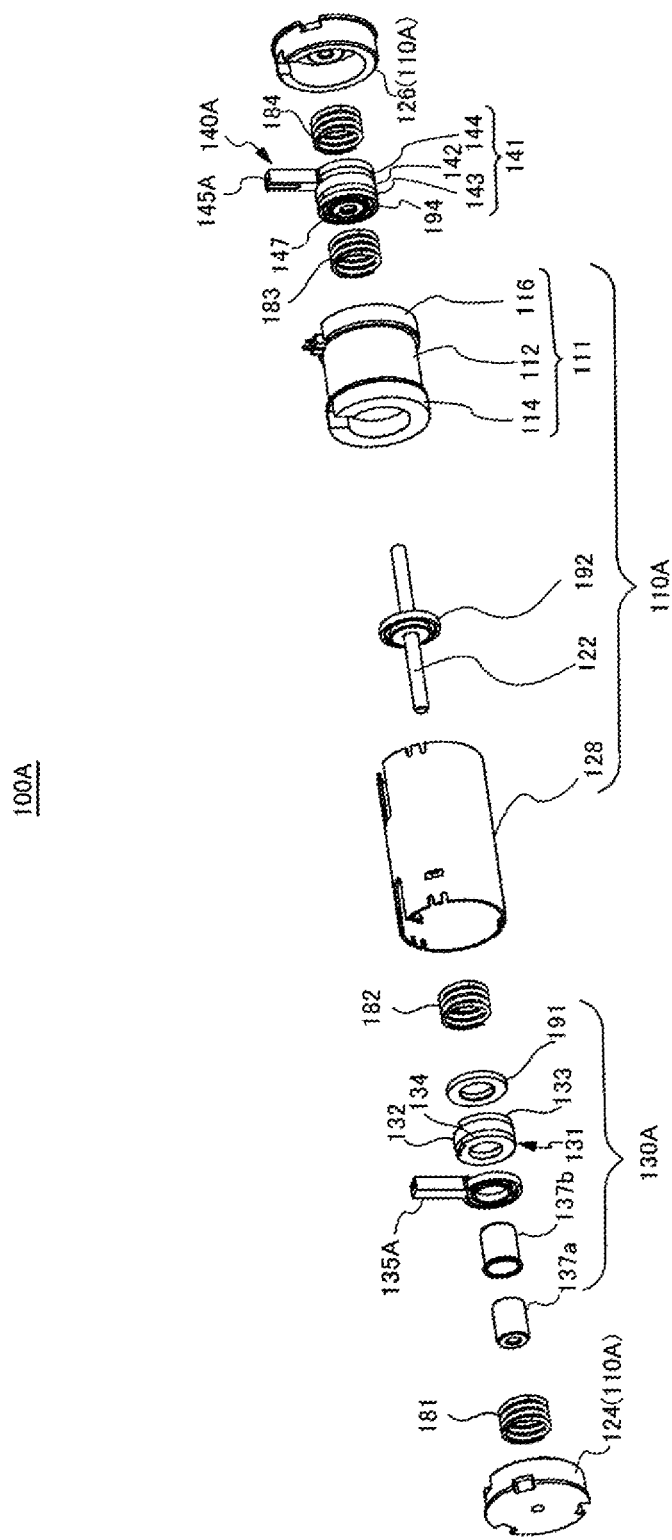
FIG. 8 is an exploded perspective view of an actuator according to Embodiment 2.
Figure 9:
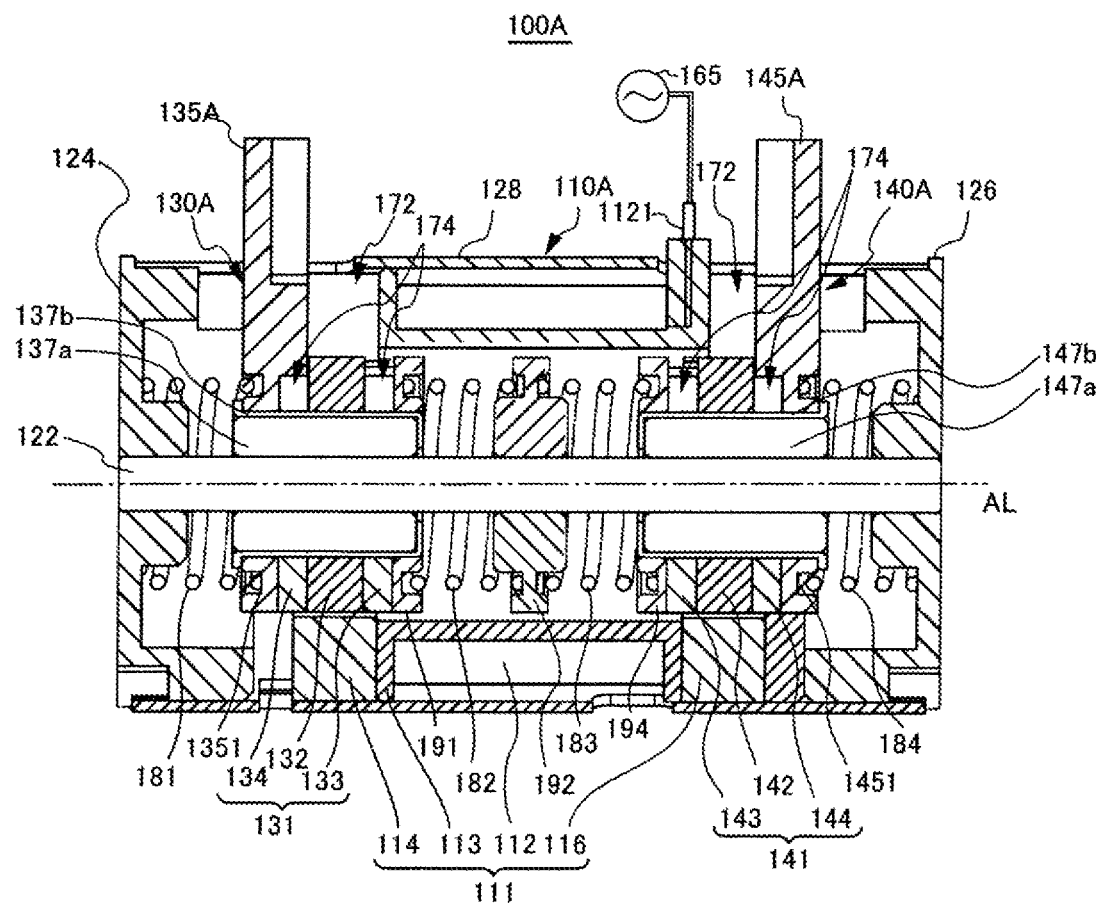
FIG. 9 is a vertical cross-sectional view along an axial direction of the actuator according to Embodiment 2.
Figure 10:
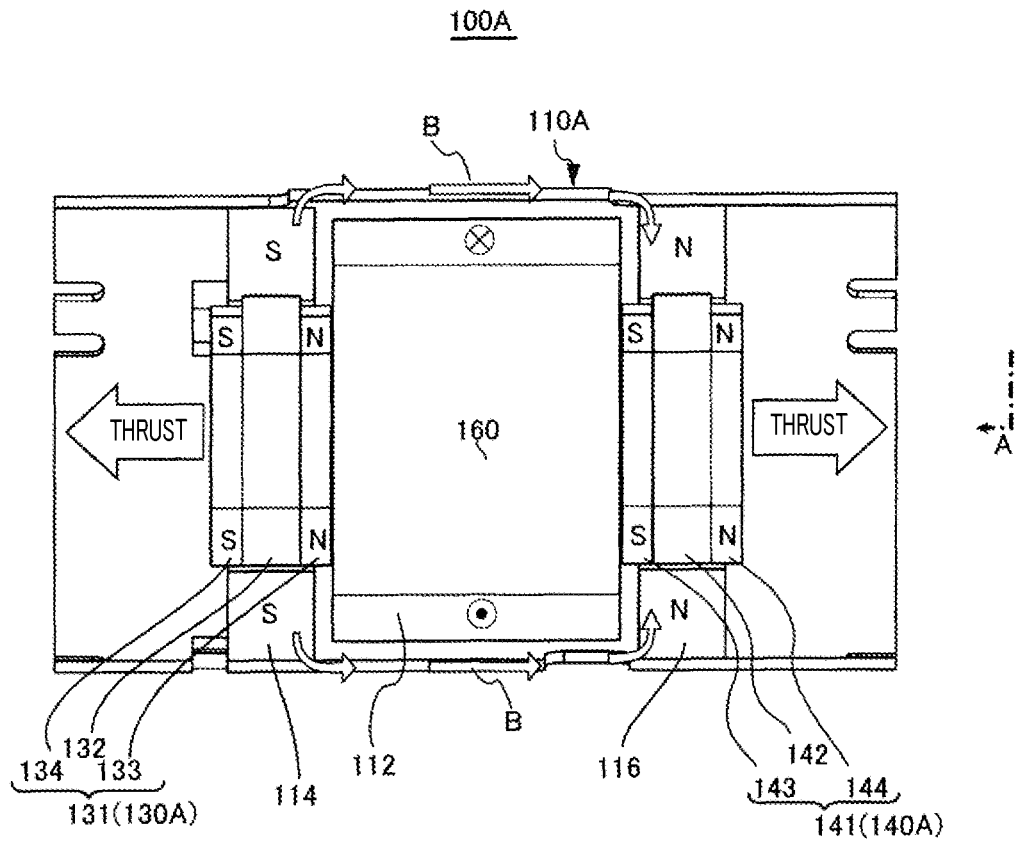
FIG. 10 is a view illustrating thrusts produced at a first movable section and a second movable section when a current flows to a coil.

FIG. 8 is an exploded perspective view of actuator 100A according to Embodiment 2. FIG. 9 is a vertical perspective view along the axial direction of actuator 100A according to Embodiment 2. FIG. 10 is a view illustrating thrusts produced at first movable section 130A and second movable section 140A when a current flows to a coil. In addition, FIG. 10 schematically illustrates the vertical cross-sectional view of FIG. 9. Furthermore, the polarities of cores 114 and 116 illustrated in FIG. 10 are an example in a case where the clockwise current flows to coil 112 in the A arrow view of coil 112. This actuator 100A is applied to an electric beauty device such as an electric razor.

In addition, actuator 100A employs the same basic configuration as those of actuator 100 according to Embodiment 1. Components that are the same as or correspond to those of actuator 100 will be assigned the same component reference numerals or components including the same component functions will be assigned symbol "A", and overlapping description will be omitted.

As illustrated in FIGS. 8 and 9, actuator 100A includes fixing section 110A, first movable section 130A and second movable section 140A. First movable section 130A and second movable section 140A are symmetrically disposed about fixing section 110A on the same axis as (more specifically, on same spindle 122 as) coil section 112 of fixing section 110A, and perform reciprocating motions in the axial direction. First movable section 130A and second movable section 140A are moved in the opposite directions in the axial direction by one coil 112 of coil section 111. That is, first movable section 130A and second movable section 140A move in directions close to each other or directions apart from each other in the axial direction.

Fixing section 110A includes coil section 111, brackets 124 and 126, case 128, spindle 122 and magnetic body member 192.

Case 128 of a tubular shape and brackets 124 and 126 form a hollow housing of actuator 100A. Coil section 111, first movable section 130A and second movable section 140A are housed in this housing.

These coil section 111, first movable section 130A and second movable section 140A are respectively disposed along the axial direction of case 128. In the present embodiment, case 128, coil section 111, first movable section 130A and second movable section 140A are disposed on same axis AL.

In addition, coil section 111 includes coil 112, bobbin 113 (see FIG. 9) and cores 114 and 116, and lead section 1121 is led from coil 112 and is connected with alternate-current electric power source 165.

Spindle 122 movably supports first movable section 130A and second movable section 140A. Spindle 122 is inserted and disposed in coil section 111, and has both end portions fixed to and supported by brackets 124 and 126. Center spring bearing section (non-magnetic member) 192 that is disposed in coil section 111, and receives mechanical springs (compression coil springs) 182 and 183 that are biasing members are attached to a center portion of spindle 122.

First movable section 130A includes first magnet section 131 that connects first inner yoke 133 and first outer yoke 134 on the both sides of first magnet 132, first output connection section 135A and first bearing section 137 and, in addition, spring bearing section 191.

Output connection section 135A that has the same function as output connection section 135 according to Embodiment 1 is attached to first outer yoke 134 of first magnet section 131 of first movable section 130A. Spring bearing section 1351 that receives mechanical spring 181 is formed on an outer surface of a portion of this output connection section 135A that surrounds spindle 122 and is attached to first outer yoke 134.

This spring bearing section 1351 is connected with the other end portion of mechanical spring 181 whose one end portion abuts against bracket 126. Mechanical spring 181 is disposed between bracket 124 and first movable section 130A (more specifically, output connection section 135A) in a state where spindle 122 is inserted to bias first movable section 130A in a direction (toward bracket 126) apart from bracket 126.

Furthermore, spring bearing section 191 is fixed to first inner yoke 133 of first magnet section 131 by adhesion. Spring bearing section 191 is disposed facing center spring bearing section 192, and mechanical spring 182 is disposed between these spring bearing section 191 and center spring bearing section 192 in a state where spindle 122 is inserted. In addition, spring bearing section 191, and first magnet 132, first inner yoke 133, first outer yoke 134 and first output connection section 135A are externally fitted on first bearing section 137. Spring bearing section 191, and first magnet 132, first inner yoke 133, first outer yoke 134 and first output connection section 135A are attached to spindle 122 with first bearing section 137 interposed therebetween movably in the axial direction on the one end side of spindle 122.

First movable section 130A including these first magnet 132, first inner yoke 133, first outer yoke 134 and first output connection section 135A, and, in addition, first bearing section 137 is sandwiched and elastically held from both sides in the axis AL direction by mechanical springs 181 and 182.

In addition, similar to Embodiment 1, first magnet section 131 is disposed with an air gap apart from the inner circumferential surface on the one end portion side of coil section 111, i.e., the inner circumferential surface of core 114, and is positioned at a position facing the inner circumferential surface of core 114 by the attraction force between first magnet section 131 and this core 114. The center in the axial direction of first magnet 132 is located at a position overlapping the center in the axial direction of core 114.

Thus, first movable section 130A is elastically held movably in the axial direction on spindle 122 by the magnetic spring that uses the attraction force of first magnet section 131 disposed facing core 114 in the radial direction, and mechanical springs 181 and 182.

Second movable section 140A is disposed symmetrically with first movable section 130A. Second movable section 140A differs from second movable section 140 in that second movable section 140A is elastically supported from both sides by mechanical springs 183 and 184. Second movable section 140A includes second magnet section 141 that connects second inner yoke 143 and second outer yoke 144 on both sides of second magnet 142, second output connection section 145A and second bearing section 147 and, in addition, spring bearing section 194.

As illustrated in FIGS. 8 and 9, output connection section 145A that has the same function as output connection section 145 according to Embodiment 1 is attached to second outer yoke 144 connected to second magnet 142 of second magnet section 141 in second movable section 140A.

Spring bearing section 1451 that receives mechanical spring 184 is formed on an outer surface of a portion of this output connection section 145A that surrounds an outer circumference of spindle 122 and is attached to second outer yoke 144.

This spring bearing section 1451 is connected with the other end portion of mechanical spring 184 whose one end portion abuts against bracket 126. Mechanical spring 184 is disposed between bracket 124 and second movable section 140A (more specifically, output connection section 145) in a state where spindle 122 is inserted to bias second movable section 140A in a direction (toward bracket 124) apart from bracket 126.

Furthermore, spring bearing section 194 is fixed to second inner yoke 143 of second magnet section 141 by adhesion. Spring bearing section 194 is disposed facing a center spring bearing section, and mechanical spring 183 is disposed between these spring bearing section 194 and the center spring bearing section in a state where spindle 122 is inserted.

Spring bearing section 194, and second magnet 142, second inner yoke 143, second outer yoke 144 and second output connection section 145A are externally fitted on second bearing section 147. Spring bearing section 194, and second magnet 142, second inner yoke 143, second outer yoke 144 and second output connection section 145A are attached to spindle 122 with second bearing section 147 interposed therebetween movably in the axial direction on the one end side of spindle 122.

Second movable section 140A including these second magnet 142, second inner yoke 143, second outer yoke 144, second output connection section 145A, spring bearing section 194 and second bearing section 147 is sandwiched and elastically held from both sides in the axis AL direction by mechanical springs 183 and 184.

In addition, similar to Embodiment 1, second magnet section 141 is disposed with an air gap apart from the inner circumferential surface on the one end portion side of coil section 111, i.e., the inner circumferential surface of core 116, and is positioned at a position facing the inner circumferential surface of core 116 by the attraction force between second magnet section 141 and this core 116. The center in the axial direction of second magnet 142 is located at a position overlapping the center in the axial direction of core 116.

Thus, second movable section 140A is elastically held movably in the axial direction on spindle 122 by the magnetic spring that uses the attraction force of second magnet section 141 disposed facing core 116 in the radial direction, and mechanical springs 183 and 184.

Actuator 100A employs a configuration where first movable section 130A and second movable section 140A are elastically held by the mechanical springs and, in addition, a configuration where annular magnetic body 160 is detached in the configuration of actuator 100.

That is, in actuator 100A, first movable section 130A and second movable section 140A, and the magnetic springs (the magnetic attraction force produced between first magnet section 131 and core 114 and the magnetic attraction force produced between second magnet section 141 and core 116) are elastically held by mechanical springs 181 to 184.

FIG. 10 is a view illustrating the thrusts produced at first movable section 130A and second movable section 140A when a current flows to coil 112. In addition, the polarities of core 114 and 116 illustrated in FIG. 10 are an example in a case where the clockwise current flows to coil 112 in the A arrow view of coil 112.

In actuator 100A, above coil 112, cores 114 and 116, first magnet 132, first inner yoke 133, first outer yoke 134, second magnet 142, second inner yoke 143 and second outer yoke 144 form the magnetic circuit.

When the current flows to coil 112 wound along the inner circumference of case 128, a flow of a magnetic flux is produced in the axial direction of coil 112. The magnetic flux to be produced flows going out from the one side in the axis AL direction of coil 112 to act on first magnet section 131 of first movable section 130A and act on core 114, case 128 of the tubular shape, core 116 and second magnet section 141 of second movable section 140A, and passing coil 112.

Furthermore, when the current flows to coil 112 in the opposite direction, the magnetic flux flows going out from the other side in the axis AL direction of coil 112 to act on the second magnet section of second movable section 140A and act on core 116, case 128, core 114 and the first magnet section of first movable section 130A, and returning to the one end side of coil 112.

In the present embodiment, first magnet 132 and second magnet 142 magnetize a side of first movable section 130A as the S-pole and a side of second movable section 140A as the N-pole in actuator 100A.

Hence, the first magnet section of first movable section 130A magnetizes first inner yoke 133 as the N-pole and first outer yoke 134 as the S-pole, and the second magnet section of second movable section 140A magnetizes second inner yoke 143 as the S-pole and second outer yoke 144 as the N-pole. That is, when the clockwise current in the A arrow view flows to coil 112, the Ampère's right-hand screw rule produces in coil 112 the magnetic flux that excites the side of second movable section 140A as the S-pole and the side of first movable section 130A as the N-pole. Thus, the flow of the magnetic flux indicated by arrow B is produced, and the entire circumference of core 114 is excited as the S-pole and the entire circumference of core 116 is excited as the N-pole.

First inner yoke 133 of first movable section 130A is the N-pole. Therefore, the magnetic attraction force produces a thrust, and first movable section 130A moves apart from the N-pole produced on the side of first movable section 130A in coil 112. This movement is the same as first movable section 130A of FIG. 7A.

Second inner yoke 143 of second movable section 140A is the S-pole. Therefore, the magnetic attraction force produces a thrust, and second movable section 140A moves apart from the S-pole produced on the side of second movable section 140A in coil 112. This movement is the same as second movable section 140A of FIG. 7A.

Thus, when the current flows to coil 112, the two movable sections of first movable section 130A and second movable section 140A simultaneously move in the directions apart from each other on the identical axis.

Furthermore, when the counterclockwise current in the A arrow view in FIG. 10 flows to coil 112, the Ampère's right-hand screw rule produces in coil 112 the magnetic flux in the opposite direction to a direction in a case where the clockwise current that excites the side of first movable section 130A as the S-pole and the side of second movable section 140A as the N-pole flows.

Thus, the entire circumference of core 114 is excited as the N-pole, and the entire circumference of core 116 is excited as the S-pole, so that first movable section 130A and second movable section 140A move toward the inside of coil 112 in the axial direction.

First inner yoke 133 of first movable section 130A is the N-pole. Therefore, the magnetic attraction force produces a thrust that travels toward coil 112, and first movable section 130A moves toward the inside of coil 112 in the axial direction. This movement is the same as movement of first movable section 130 illustrated in FIG. 7B.

Second inner yoke 143 of second movable section 140A is the S-pole. Therefore, the magnetic attraction force produces a thrust that travels toward coil 112, and second movable section 140A moves toward the inside of coil 112 in the axial direction. This movement is the same as movement of second movable section 140 illustrated in FIG. 7B. Thus, when the reverse current flows to coil 112, the two movable sections of first movable section 130A and second movable section 140A simultaneously move in the directions close to each other on the identical axis.

Hence, similar to Embodiment 1, when the alternate-current flows to coil 112, first movable section 130A and second movable section 140A perform reciprocating motions in the opposite directions. In addition, an equation of motion that indicates an operation principal of actuator 100A is expressed by above equation 1 and a circuit equation is expressed by above equation 2. That is, first movable section 130A and second movable section 140A perform the reciprocating motions based on equations 1 and 2, respectively. Furthermore, the resonance frequency of actuator 100A is determined based on masses and spring constants (that are spring constants of magnetic springs and spring constants of mechanical springs (compression coil springs)) of first movable section 130A and second movable section 140A as indicated by above equation 3. By driving actuator 100A by the alternate-current of the frequency that is substantially equal to the resonance frequency $f_r$, it is possible to efficiently obtain a high output similar to actuator 100 according to Embodiment 1. That is, it is possible to drive actuator 100A with low power consumption in a steady state, so that energy efficiency of actuator 100A improves.

Furthermore, similar to actuator 100, according to actuator 100A according to Embodiment 2, when the current flows to coil 112, first magnet 132 and second magnet 142 obtain the thrusts in the opposite directions on the same axis and substantially simultaneously move in the opposite directions according to the direction of the magnetic flux produced by coil 112 according to the Ampère's right-hand screw rule. In this regard, first movable section 130A including first magnet 132, and second movable section 140A including second magnet 142 respectively move in the opposite directions substantially simultaneously on the identical axis.

Actuator 100A can provide basically the same effect as that of actuator 100. Particularly, first movable section 130A and second movable section 140A perform the reciprocating motions in the opposite directions on the same axis and thereby cancel vibration, so that actuator 100A can effectively prevent transmission of the vibration to the user. Furthermore, a spindle mechanism that supports first movable section 130A and second movable section 140A on the identical axis is used. Consequently, it is possible to easily design the gravitational centers of second movable section 140A and first movable section 130A on the identical axis, remove a shift in the vibration occurrence direction (the radiation direction from the axis in particular), and effectively prevent vibration compared to the structure that has the shift of the spindle that supports each movable section.

Furthermore, the magnetic attraction force produced by the first magnet section (first magnet 132 and first inner and outer yokes 133 and 134) and the second magnet section (second magnet 142 and second inner and outer yokes 143 and 144) whose movement in the radiation direction is restricted by spindle 122, and cores 114 and 116 restrict movement in the axial direction and positions the movement at a default position.

Furthermore, cores 114 and 116 of fixing section 110A that face each other in the inner and outer circumferential directions (radial direction) and each of yokes 133 and 134, and 143 and 144 of first movable section 130A and second movable section 140A are provided with slits (cutout portions) 172 and recessed portions (cutout portions) 174. Consequently, a position torque is produced in the rotation direction (circumferential direction) between core 114, and first inner yoke 133 and first outer yoke 134, so that movement in the circumferential direction of first movable section 130A and second movable section 140A is restricted.

Consequently, the positions of first movable section 130A and second movable section 140A can be stabilized without setting rotation restriction toward the outside, and actuator 100A can be operated alone. Furthermore, it is possible to stabilize the position of each movable section during assembly, too, and improve assembly.

Furthermore, it is not necessary to provide a dynamic vibration absorber and a power conversion mechanism. Consequently, it is possible to achieve a saved space and miniaturization, and improve the degree of design freedom and design of a product to be mounted.

Consequently, by applying actuator 100A, it is possible to realize the electric beauty device that has good design, causes little vibration and little noise and provides comfort for the user.

Furthermore, in actuator 100A, coil 112 is wound in the same direction over the entire length of fixing section 110A, and the magnetization direction of first magnet 132 is opposite to the magnetization direction of second magnet 142. Consequently, second movable section 140A and first movable section 130A can perform the reciprocating motions in the opposite directions with a simple configuration.

Furthermore, actuator 100A is an inner rotor type, and is not likely to contact the movable sections when being mounted. Consequently, unlike an outer rotor type adopting a structure that includes the movable sections that move outside the fixing section, it is not necessary to secure a space that becomes movable regions of the movable sections.

According to actuator 100A of the inner rotor type, the outermost surface of the housing is fixing section 110A. Consequently, a portion of a fixing target to which actuator 100A can be fixed can be secured widely, and actuator 100A can be easily mounted. Furthermore, first movable section 130A and second movable section 140A are housed in the housing. Consequently, compared to the outer rotor type, when actuator 100A is mounted, a foreign material is hardly mixed in a gap between each of first movable section 130A and second movable section 140A and fixing section 110A, and an operation failure and damages hardly occur.

By the way, according to the configuration of actuator 100 according to Embodiment 1, when spring constants of the elastic holding sections that elastically hold first movable section 130 and second movable section 140 are set, only the magnetic spring is insufficient, and a settable range of the drive frequency narrows in some cases. When first movable section 130A and second movable section 140A are driven at a predetermined frequency, if the spring constant becomes small, the masses of first movable section 130A and second movable section 140A need to be made small accordingly, and therefore outputs lower as a result.

By contrast with this, actuator 100A according to the present embodiment includes magnetic springs of the first magnet section and core 114, and the second magnet section and core 116 (that may also include coil 112 to which electric power is distributed) and, in addition, mechanical springs (coil springs) 181, 182, 183 and 184 as the elastic holding sections that elastically hold first movable section 130A and second movable section 140A.

Consequently, the degree of design freedom of the spring constants of the elastic holding sections improve, so that it is easy to set the drive frequency.

Furthermore, even when the first and second movable sections are driven at a desired frequency, it is possible to increase the masses of the drive target first and second movable sections, too, according to both of the spring constants and increase the outputs.

Embodiment 3

Figure 11:
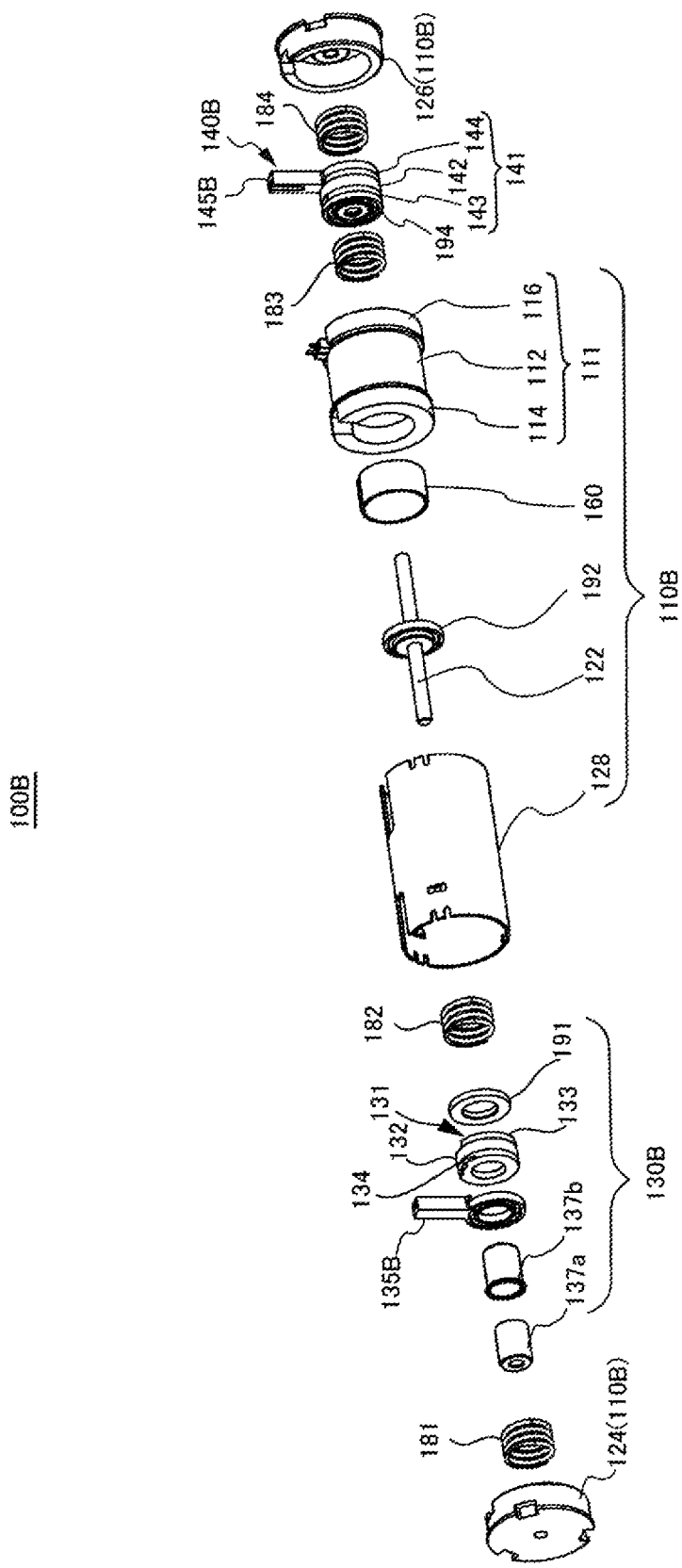
FIG. 11 is an exploded perspective view of an actuator according to Embodiment 3.
Figure 12:
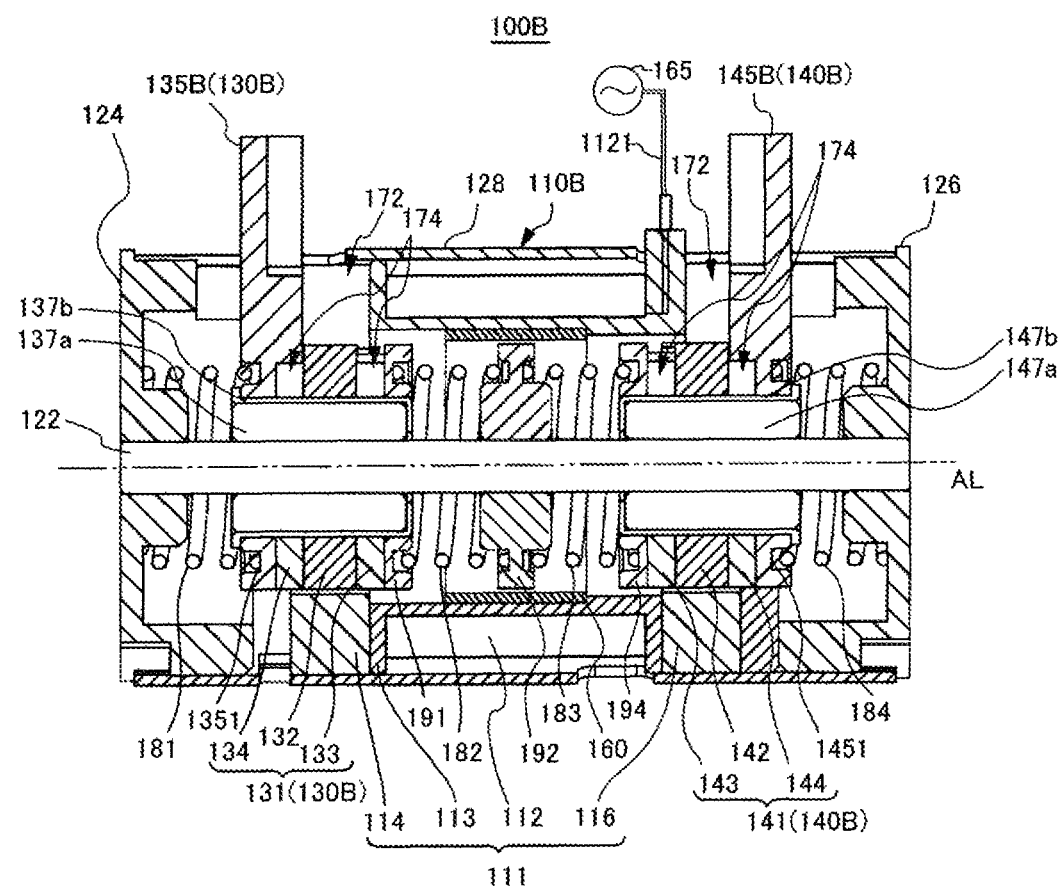
FIG. 12 is a vertical cross-sectional view along an axial direction of the actuator according to Embodiment 3.

FIG. 11 is an exploded perspective view of actuator 100B according to Embodiment 3. FIG. 12 is a vertical cross-sectional view along the axial direction of actuator 100B according to Embodiment 3. This actuator 100B is applied to an electric beauty device such as an electric razor.

In addition, actuator 100B employs the same basic configuration as those of actuator 100 according to Embodiment 1. Components that are the same as or correspond to those of actuator 100 will be assigned the same component reference numerals or components including the same component functions will be assigned symbol "B", and overlapping description will be omitted.

As illustrated in FIGS. 11 and 12, actuator 100B includes fixing section 110B, first movable section 130B and second movable section 140B. First movable section 130B and second movable section 140B are symmetrically disposed about fixing section 110B on the same axis as (more specifically, on same spindle 122 as) coil 112 of fixing section 110B, and perform reciprocating motions in the axial direction. First movable section 130B and second movable section 140B are moved in the opposite directions in the axial direction by one coil 112 of coil section 111. That is, first movable section 130B and second movable section 140B move in directions close to each other or directions apart from each other in the axial direction.

Fixing section 110B includes coil section 111, brackets 124 and 126, case 128, spindle 122, annular magnetic body 160 and center spring bearing section 192.

Case 128 of a tubular shape and brackets 124 and 126 form a hollow housing of actuator 100B. Coil section 111, first movable section 130B and second movable section 140B are housed in this housing.

These coil section 111, first movable section 130B and second movable section 140B are each disposed along the axial direction of case 128. In the present embodiment, case 128, coil section 111, first movable section 130B and second movable section 140B are disposed on same axis AL.

In addition, coil section 111 includes coil 112, bobbin 113 (see FIG. 9) and cores 114 and 116, and lead section 1121 is led from coil 112 and is connected with alternate-current electric power source 165. In addition, annular magnetic body 160 is disposed along the inner circumferential surface of coil section 111. Annular magnetic body 160 is a magnetic material of an annular shape (a tubular shape herein), and relaxes and reduces a magnetic resistance produced on the side of coil 112.

Spindle 122 movably supports first movable section 130B and second movable section 140B. Spindle 122 is inserted and disposed in coil section 111 and annular magnetic body 160, and has both end portions fixed to and supported by brackets 124 and 126. Center spring bearing section 192 that is disposed in coil section 111, and receives mechanical springs (compression coil springs) 182 and 183 that are biasing members are attached to a center portion of spindle 122.

First movable section 130B includes first magnet section 131 that connects first inner yoke 133 and first outer yoke 134 on the both sides of first magnet 132, first output connection section 135B and first bearing section 137 and, in addition, spring bearing section 191.

Output connection section 135B that has the same function as output connection section 135 according to Embodiment 1 is attached to first outer yoke 134 of first magnet section 131 of first movable section 130B. Spring bearing section 135I that receives mechanical spring 181 is formed on an outer surface of a portion of this output connection section 135B that surrounds spindle 122 and is attached to first outer yoke 134. This spring bearing section 135I is connected with the other end portion of mechanical spring 181 whose one end portion abuts against bracket 126. Mechanical spring 181 is disposed between bracket 124 and first movable section 130B (more specifically, output connection section 135B) in a state where spindle 122 is inserted to bias first movable section 130B in a direction (toward bracket 126) apart from bracket 126.

Furthermore, spring bearing section 191 is fixed to first inner yoke 133 of first magnet section 131 by adhesion. Spring bearing section 191 is disposed facing center spring bearing section 192, and mechanical spring 182 is disposed between these spring bearing section 191 and center spring bearing section 192 in a state where spindle 122 is inserted. In addition, spring bearing section 191, and first magnet 132, first inner yoke 133, first outer yoke 134 and first output connection section 135B are externally fitted on first bearing section 137, and are attached to spindle 122 with first bearing section 137 interposed therebetween movably in the axial direction on the one end side of spindle 122.

First movable section 130B including these first magnet 132, first inner yoke 133, first outer yoke 134 and first output connection section 135B and, in addition, first bearing section 137 is sandwiched and elastically held from the both sides in the axis AL direction by mechanical springs 181 and 182.

In addition, similar to Embodiment 1, first magnet section 131 is disposed with an air gap apart from the inner circumferential surface on the one end portion side of coil section 111, i.e., the inner circumferential surface of core 114, and is positioned at a position facing the inner circumferential surface of core 114 by the attraction force between first magnet section 131 and this core 114. The center in the axial direction of first magnet 132 is located at a position overlapping the center in the axial direction of core 114.

Thus, first movable section 130B is elastically held movably in the axial direction on spindle 122 by the magnetic spring that uses the attraction force of first magnet section 131 disposed facing core 114 in the radial direction, and mechanical springs 181 and 182.

Second movable section 140B is disposed symmetrically with first movable section 130B. Second movable section 140B differs from second movable section 140 in that second movable section 140B is elastically supported from the both sides by mechanical springs 183 and 184. Second movable section 140B includes second magnet section 141 that connects second inner yoke 143 and second outer yoke 144 on the both sides of second magnet 142, second output connection section 145B (also referred to as "output connection section 145B") and second bearing section 147 and, in addition, spring bearing section 194.

As illustrated in FIGS. 11 and 12, output connection section 145B that has the same function as output connection section 145 according to Embodiment 1 is attached to second outer yoke 144 connected to second magnet 142 of second magnet section 141 in second movable section 140B.

Spring bearing section 145I that receives mechanical spring 184 is formed on an outer surface of a portion of this output connection section 145B that surrounds an outer circumference of spindle 122 and is attached to second outer yoke 144.

This spring bearing section 145I is connected with the other end portion of mechanical spring 184 whose one end portion abuts against bracket 126. Mechanical spring 184 is disposed between bracket 124 and second movable section 140B (more specifically, output connection section 145B) in a state where spindle 122 is inserted to bias second movable section 140B in a direction (toward bracket 124) apart from bracket 126.

Furthermore, spring bearing section 194 is fixed to second inner yoke 143 of second magnet section 141 by adhesion. Spring bearing section 194 is disposed facing center spring bearing section 192, and mechanical spring 183 is disposed between these spring bearing section 194 and center spring bearing section 192 in a state where spindle 122 is inserted.

In addition, spring bearing section 194, and second magnet 142, second inner yoke 143, second outer yoke 144 and output connection section 145B are externally fitted on second bearing section 147, and are attached to spindle 122 with second bearing section 147 interposed therebetween movably in the axial direction on the one end side of spindle 122.

Second movable section 140B including these second magnet 142, second inner yoke 143, second outer yoke 144, output connection section 145B, spring bearing section 194 and, in addition, second bearing section 147 is sandwiched and elastically held from the both sides in the axis AL direction by mechanical springs 183 and 184.

In addition, similar to Embodiment 1, second magnet section 141 is disposed with an air gap apart from the inner circumferential surface on the one end portion side of coil section 111, i.e., the inner circumferential surface of core 116, and is positioned at a position facing the inner circumferential surface of core 116 by the attraction force between second magnet section 141 and this core 116. The center in the axial direction of second magnet 142 is located at a position overlapping the center in the axial direction of core 116.

Thus, second movable section 140B is elastically held movably in the axial direction on spindle 122 by the magnetic spring that uses the attraction force of second magnet section 141 disposed facing core 116 in the radial direction, and mechanical springs 183 and 184.

Actuator 100B employs a configuration where first movable section 130B and second movable section 140B are elastically held by the mechanical springs and, in addition, a configuration where annular magnetic body 160 is detached in the configuration of actuator 100.

That is, in actuator 100B, first movable section 130B and second movable section 140B, and the magnetic springs (the magnetic attraction force produced between first magnet section 131 and core 114 and the magnetic attraction force produced between second magnet section 141 and core 116) are elastically held by mechanical springs 181 to 184.

In addition, a configuration of the magnetic circuit of actuator 100B according to Embodiment 3 and an operation in a case where a current flows to the coil are the same as those of actuator 100 according to Embodiment 1, and therefore will not be described. Hence, similar to Embodiment 1, when the alternate-current flows to coil 112, first movable section 130B and second movable section 140B perform reciprocating motions in the opposite directions. In addition, the equation of motion that indicates the operation principal of actuator 100B is expressed by above equation 1 and the circuit equation is expressed by above equation 2.

That is, first movable section 130B and second movable section 140B perform the reciprocating motions based on equations 1 and 2, respectively. Furthermore, the resonance frequency of actuator 100B is determined based on masses and spring constants (that are spring constants of magnetic springs and spring constants of mechanical springs (compression coil springs)) of first movable section 130B and second movable section 140B as indicated by above equation 3. By driving actuator 100B by the alternate-current of the frequency that is substantially equal to the resonance frequency $f_r$, it is possible to efficiently obtain a high output similar to actuator 100 according to Embodiment 1. That is, it is possible to drive actuator 100B with low power consumption in a steady state, so that energy efficiency of actuator 100B improves.

Furthermore, similar to actuator 100, according to actuator 100B according to Embodiment 3, when the current flows to coil 112, first magnet 132 and second magnet 142 obtain the thrusts in the opposite directions on the same axis and substantially simultaneously move in the opposite directions according to the direction of the magnetic flux produced by coil 112 according to the Ampère's right-hand screw rule. In this regard, first movable section 130B including first magnet 132, and second movable section 140B including second magnet 142 respectively move in the opposite directions substantially simultaneously on the identical axis.

Actuator 100B can obtain basically the same effect as that of actuator 100.

Furthermore, according to the configuration of actuator 100 according to Embodiment 1, when spring constants of the elastic holding sections that elastically hold first movable section 130 and second movable section 140 by the magnetic springs are set, it is considered to widen a settable range of the drive frequency. When first movable section 130A and second movable section 140A are driven at a predetermined frequency, if the spring constant becomes small, the masses of first movable section 130A and second movable section 140A need to be made small accordingly, and therefore outputs lower as a result.

By contrast with this, actuator 100B according to Embodiment 3 includes magnetic springs of the first magnet section and core 114, and the second magnet section and core 116 (that may also include coil 112 to which electric power is distributed) and, in addition, mechanical springs (coil springs) 181, 182, 183 and 184 as the elastic holding sections that elastically hold first movable section 130B and second movable section 140B.

Consequently, the degree of design freedom of the spring constants of the elastic holding sections improve, so that it is easy to set the drive frequency.

Furthermore, even when the first and second movable sections are driven at a desired frequency, it is possible to increase the masses of the drive target first and second movable sections, too, according to both of the spring constants and increase the outputs.

Embodiment 4

Figure 13:
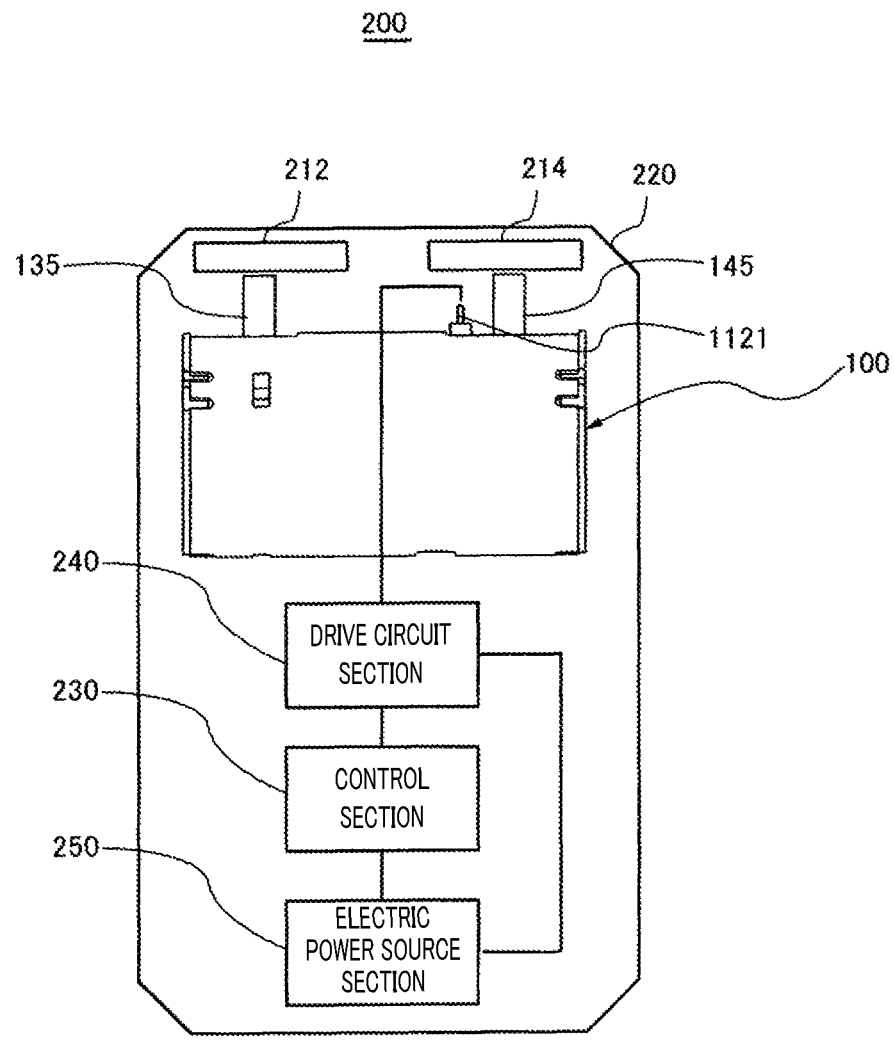
FIG. 13 is a schematic view illustrating an example of an electric beauty device including the actuator according to an embodiment.

FIG. 13 is a schematic view illustrating an example of electric beauty device 200 including the actuator according to the present invention.

Electric beauty device 200 illustrated in FIG. 13 includes a plurality of vibrators, and is configured to cause a plurality of these vibrators to perform linear reciprocating motions simultaneously in different directions. For example, electric beauty device 200 can be used an electric razor, a toothbrush or a polishing apparatus (nail polishing).

Electric beauty device 200 illustrated in FIG. 13 includes actuator 100, vibrators 212 and 214 such as a blade and a brush, control section 230, drive circuit section 240 and electric power source section 250. In addition, actuator 100, vibrators 212 and 214, control section 230, drive circuit section 240 and electric power source section 250 are disposed in housing 220.

In electric beauty device 200, vibrators 212 and 214 are fixed to first output connection section 135 and second output connection section 145 of actuator 100, respectively. When actuator 100 is driven, vibrators 212 and 214 can move following operations of output connection sections 135 and 145 that perform reciprocating motions and vibrate in the identical direction facing different directions.

Actuator 100 is connected to drive circuit section 240 that includes the drive circuit that drives actuator 100. Drive circuit section 240 is an H bridge circuit, and switches a direction of a current that is supplied from one electric power source by control section 230, and flows to coil 112 of the actuator. Control section 230 is composed by a microcomputer, and controls each section of the electric beauty device. Control section 230 in particular controls electric power supplied from electric power source section 250 to actuator 100 via drive circuit section 240, and controls driving of actuator 100. More specifically, control section 230 controls an alternate-current of a frequency that is equal to the resonance frequency of first movable section 130 and second movable section 140 elastically held by the magnetic springs in actuator 100 to supply to coil 112 of actuator 100. Electric power source section 250 supplies electric power to control section 230 and drive circuit section 240. Electric power source section 250 is an alternate-current electric power source, and supplies an alternate-current voltage to actuator 100 via drive circuit section 240.

In electric beauty device 200, vibrators 212 and 214 such as the brush and the blade are fixed to first output connection section 135 and second output connection section 145 of actuator 100, and are controlled to drive via drive circuit section 240, control section 230 and electric power source section 250. The movable sections that vibrate perform reciprocating motions (vibrate) in the different directions on the identical axis, and actuator 100 causes little vibration and can be miniaturized, so that it is possible to realize the beauty device that causes little vibration and saves a space.

In addition, instead of actuator 100, actuator 100A or actuator 100B may be applied to electric beauty device 200. Electric beauty device 200 including one of actuators 100A and 100B can also provide the same function and effect as those of the configuration where actuator 100 is mounted.

The invention invented by the inventors have been specifically described based on the embodiments above. However, the present invention is not limited to the above embodiments, and can be changed without departing from the gist of the invention.

Furthermore, in, for example, Embodiment 2 and Embodiment 3, elastic members such as leaf springs are applicable instead of compression coil springs 183, 184, 182 and 152.

Furthermore, as long as each embodiment employs a configuration where first movable sections 130, 130A and 130B and second movable sections 140, 140A and 140B are elastically held movably in the axial direction, each embodiment may not need spindle 122, and a member other than spindle 122 may guide each movable section in the axial direction. For example, there may be a configuration where linear rails are provided to the fixing section, and the movable sections are movable only in one direction along these linear rails.

Furthermore, one spindle 122 is applied in each embodiment. The present invention is not limited to this, and may employ a configuration where a plurality of spindle sections are used as long as the spindle sections hold each of first movable sections 130, 130A and 130B and second movable sections 140, 140A and 140B movably on the same axis.

Furthermore, in Embodiments 1 to 3, a plurality of square magnets may be combined and be applicable as a magnet of a square tubular shape as a whole instead of first magnet 132 and second magnet 142.

Furthermore, by making fixing sections 110, 110A and 110B and brackets 124 and 126 by a metal material, it is possible to reduce leakage of the magnetic flux and electromagnetic noise produced in the actuator to the outside of the actuator.

It should be understood that the disclosed embodiments disclosed herein are exemplary in all aspects but are not restrictive. The scope of the present invention is represented not by the above description but by the claims, and meanings equivalent to the claims, and all changes within the scope of the invention are intended to be included. Various alterations can be made to the present invention described above as long as such alternations do not depart from the spirit of the present invention, and it should be understood that those resulting from such alterations fall within the scope of the present invention.

The disclosure of Japanese Patent Application No. 2016-073071, filed on Mar. 31, 2016, including the specification, drawings and abstract, is incorporated herein by reference in its entirety.

REFERENCE SIGNS LIST 100, 100A, 100B Actuator
110, 110A, 110B Fixing section
111 Coil section
112 Coil
113 Bobbin
114, 116 Core
122 Spindle
124, 126 Bracket
128 Case
130, 130A, 130B First movable section
131 First magnet section
132 First magnet
133 First inner yoke
134 First outer yoke
135, 135A, 135B First output connection section
137 First bearing section
137a, 147a Bearing body
137b, 147b Bearing holder
140, 140A, 140B Second movable section
141 Second magnet section
142 Second magnet
143 Second inner yoke
144 Second outer yoke
145, 145A, 145B Second output connection section
147 Second bearing section
160 Annular magnetic body
165 Alternate-current electric power source
172 Slit (cutout portion)
174 Recessed portion (cutout portion)
181, 182, 183, 184 Mechanical spring
191, 194 Spring bearing section
192 Center spring bearing section (non-magnetic member)
200 Electric beauty device
230 Control section
240 Drive circuit section
250 Electric power source section

The invention claimed is:

1. An actuator, comprising:
a fixing section that includes a coil;
a first movable section that includes a first magnet that is magnetized in an axial direction of the coil and is disposed on a side of one end portion in an axial direction of the coil, the first movable section being disposed on an inner side of the one end portion of the coil movably in the axial direction of the coil in a state where the first movable section is elastically held; and
a second movable section that includes a second magnet that is magnetized in the axial direction of the coil and is disposed on a side of an other end portion in an axial direction of the coil, the second movable section being disposed on an inner side of the other end portion of the coil movably in the axial direction of the coil in a state where the second movable section is elastically held, wherein:
the first magnet and the second magnet are disposed such that same magnetic poles in the axial direction are in an identical direction; and
when a current flows to the coil, the first movable section and the second movable section move in opposite directions on a same axis.

2. The actuator according to claim 1, wherein:
the fixing section includes a spindle section in which the coil is inserted; and
the first movable section and the second movable section are attached to the spindle section movably in the axial direction.

3. The actuator according to claim 1, wherein:
two cores are joined to the sides of the both end portions of the coil, the two cores being formed by annular magnetic bodies along a winding direction of the coil and forming an electromagnet together with the coil; and
the two cores, and the first magnet and the second magnet form magnetic springs that elastically support the first movable section and the second movable section by a magnetic attraction force produced between the two cores, and the first magnet and the second magnet.

4. The actuator according to claim 3, wherein:
the first movable section and the second movable section include yokes joined to both sides of magnetized surfaces of the first magnet and the second magnet; and
an outer circumferential surface of the first magnet and outer circumferential surfaces of the yokes on the both sides of the first magnet, and an outer circumferential surface of the second magnet and outer circumferential surfaces of the yokes on the both sides of the second magnet are each disposed facing inner circumferential surfaces of the two cores.

5. The actuator according to claim 4, wherein a cutout portion formed by being cut out in the axial direction is formed on at least one of the core and the yoke facing the core.

6. The actuator according to claim 1, wherein the first movable section and the second movable section each are elastically held movably in the axial direction by biasing members.

7. The actuator according to claim 1, further comprising an annular magnetic member disposed along an inner circumferential surface of the coil.

8. The actuator according to claim 1, wherein the coil is driven at a substantially resonance frequency.

9. An electric beauty device comprising the actuator according to claim 1.

* * * * *